(No Model.)
C. E. CLEVELAND & J. HANSON.
SIDE DRESSER FOR SAWS.
No. 380,089. Patented Mar. 27, 1888.
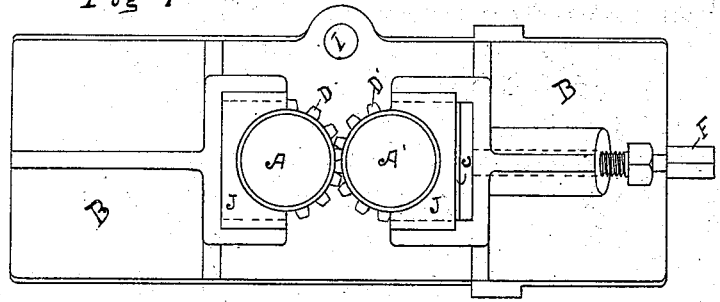
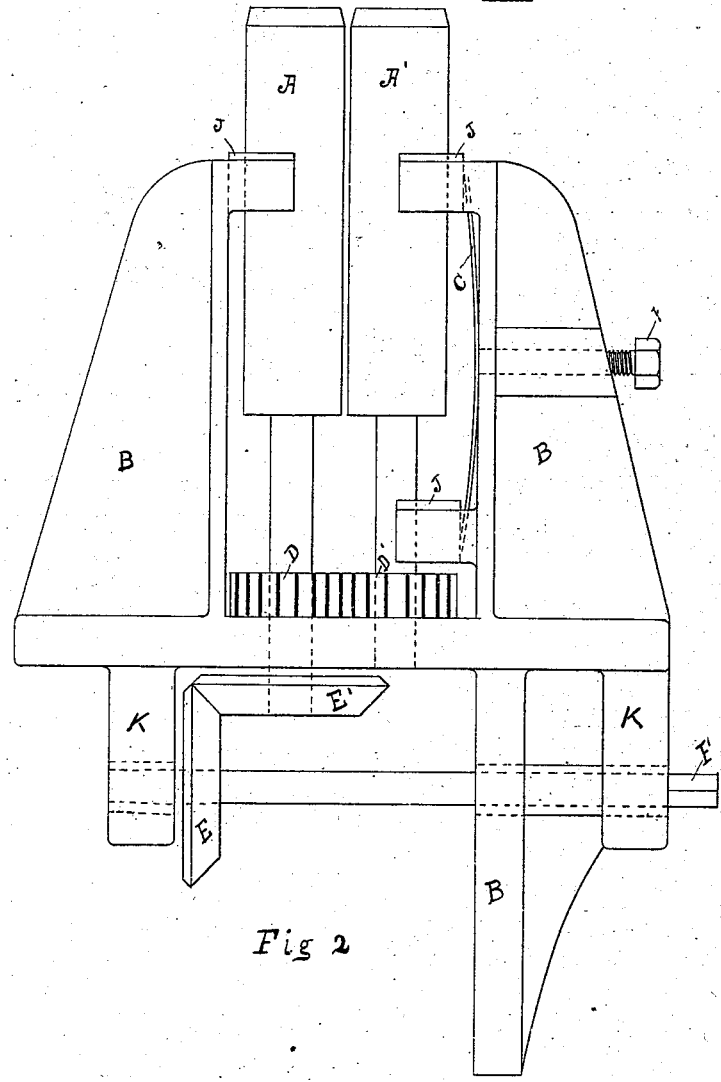
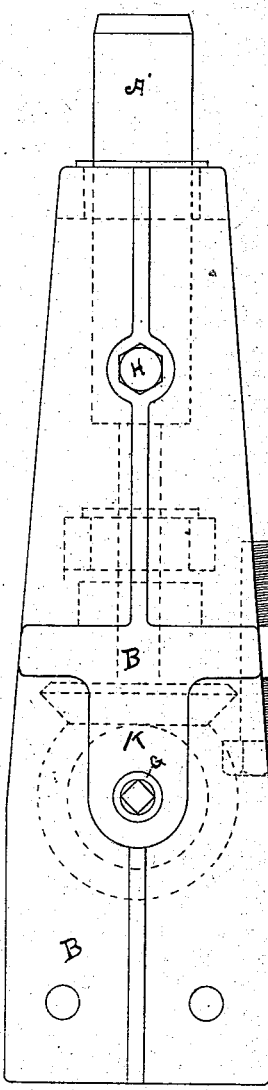
Witnesses:
Inventors

UNITED STATES PATENT OFFICE.

CHARLES E. CLEVELAND AND JOSEPH HANSON, OF FORT WAYNE, INDIANA; SAID CLEVELAND ASSIGNOR TO SAID HANSON.

SIDE DRESSER FOR SAWS.

SPECIFICATION forming part of Letters Patent No. 380,089, dated March 27, 1888.

Application filed September 17, 1887. Serial No. 249,995. (No model.)

*To all whom it may concern:*

Be it known that we, CHARLES E. CLEVELAND and JOSEPH HANSON, citizens of the United States, residing at Fort Wayne, in the county of Allen and State of Indiana, have invented a new and useful Side Dress, of which the following is a specification.

Our invention relates to side dressers for band and kindred saws, in which the sides of the teeth are side-dressed by compression.

The object of our invention is to provide a side dress that will leave the cutting-points of the teeth all the same width and tapering down to the saw-plate at any angle desired, something that has never been satisfactorily done heretofore.

We will proceed to describe one way in which we have carried out our improvement in practical form, and then point out definitely in claims the special improvements which we believe to be new and wish to protect by Letters Patent.

In the drawings, Figure 1 is a top view; Fig. 2, a side view; Fig. 3, a front view.

The casting B and the hangers K, cast thereon, constitute the frame of the machine. In the hangers K turns the shaft F, carrying the miter-gear E, meshed into miter-gear E', which is keyed onto the lower end of roller A. The spur-gears D D' are also keyed onto the lower end of the rollers A A', respectively, for the purpose of communicating motion from one roller to the other. The rollers A A' are made of steel and are beveled at their upper ends, as shown by the drawings, to any desired bevel or shape. By changing the bevel of these rollers it will change the shape of the side of the saw-teeth, as it is these rollers which shape or side-dress the saw-teeth by pressing them into shape.

The steel spring C is provided, so that when the set-screw H is screwed up it will press against the adjustable box J, thus pushing the roller A' against the saw. Now if there are any lumps or uneven places in the saw-plate this spring C will allow the roller A' to give back, and thus not press against the saw-plate so hard as to stretch or injure it.

To operate the side dress: After the saw has been swaged—that is, the points of the teeth flattened or spread out—place it between the rollers A A', allowing the back to rest on the adjusting-screw I, and adjust the saw so that the points of the teeth come about even with the top of the rollers A A'. Then screw up the screw H, bringing the rollers A A' firmly against the saw. Now by turning the shaft F the saw is, by the motion of the rollers A A', drawn through between the aforesaid rollers, which press the teeth all to an even width. The shaft F may be driven by hand or power, as desired.

In order that the saw may not be forced up off from the screw I by the action of the rollers, we usually tilt the machine back, so that as the saw is being drawn through, the rollers at the same time draw the saw down.

We do not wish to be understood as limiting ourselves in all particulars to the precise details of construction as herein shown and described, for mechanical changes may be made without departing from the main ideas of our invention, and different devices may be substituted for those here shown.

Having thus described our invention, what we claim as new, and desire to secure by Letters Patent, is—

1. In a side dress for band and like saws, the combination of the rollers A A', having their upper ends beveled, the cog-wheels D D', the frame B, the hangers K, miter-gears E E', and the shaft F, substantially as and for the purpose specified.

2. In a side dress for band and kindred saws, the combination of the rollers A A', the spring C, the screw H, the adjustable box J, the miter-gears E E', the hangers K, and the shaft F, substantially as and for the purpose specified.

3. The combination, in a side dress for band and kindred saws, of the rollers A A', the frame B, the screw I, the cog-wheels D D', the spring C, and the screw H, substantially as and for the purpose specified.

CHAS. E. CLEVELAND.
JOSEPH HANSON.

Witnesses:
J. M. KUHNS,
S. MOTTINGER.